(12) United States Patent
Sugiura et al.

(10) Patent No.: US 9,236,601 B2
(45) Date of Patent: *Jan. 12, 2016

(54) PLATE-LIKE PARTICLE OF CATHODE ACTIVE MATERIAL FOR LITHIUM SECONDARY BATTERY, CATHODE OF THE LITHIUM SECONDARY BATTERY AND LITHIUM SECONDARY BATTERY

(75) Inventors: Ryuta Sugiura, Nagoya (JP); Nobuyuki Kobayashi, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 631 days.

This patent is subject to a terminal disclaimer.

(21) Appl. No.: 13/165,337

(22) Filed: Jun. 21, 2011

(65) Prior Publication Data

US 2011/0318640 A1    Dec. 29, 2011

(30) Foreign Application Priority Data

Jun. 23, 2010  (JP) ................................. 2010-142444

(51) Int. Cl.
| | |
|---|---|
| *H01M 4/24* | (2006.01) |
| *H01M 4/583* | (2010.01) |
| *B32B 5/16* | (2006.01) |
| *H01M 4/131* | (2010.01) |
| *C01G 51/00* | (2006.01) |

(Continued)

(52) U.S. Cl.
CPC ............... *H01M 4/131* (2013.01); *C01G 51/42* (2013.01); *C01G 53/006* (2013.01); *C01G 53/04* (2013.01); *C01G 53/42* (2013.01); *H01M 4/525* (2013.01); *C01P 2002/52* (2013.01); *C01P 2002/74* (2013.01); *C01P 2004/22* (2013.01); *C01P 2006/16* (2013.01); *C01P 2006/40* (2013.01); *H01M 10/0525* (2013.01); *Y02E 60/122* (2013.01); *Y10T 428/2982* (2015.01)

(58) Field of Classification Search
None
See application file for complete search history.

(56) References Cited

U.S. PATENT DOCUMENTS

| 5,631,100 | A | 5/1997 | Yoshino et al. |
|---|---|---|---|
| 2003/0170540 | A1 | 9/2003 | Ohzuku et al. |

(Continued)

FOREIGN PATENT DOCUMENTS

| EP | 2 314 545 A1 | 4/2011 |
|---|---|---|
| JP | 05-226004 A1 | 9/1993 |

(Continued)

OTHER PUBLICATIONS

Xie, J., N. Imanishi, T. Matsumura, A. Hirano, Y. Takeda, and O. Yamamoto. "Orientation Dependence of Li—ion Diffusion Kinetics in LiCoO2 Thin Films Prepared by RF Magnetron Sputtering." Solid State Ionics 179.9-10 (2008): 362-370.*

*Primary Examiner* — Barbara Gilliam
*Assistant Examiner* — Stephan Essex
(74) *Attorney, Agent, or Firm* — Burr & Brown, PLLC (57) ABSTRACT

To provide a lithium secondary battery which has high capacity while maintaining excellent charge-discharge characteristic, and to provide a cathode of the lithium secondary battery and a plate-like particle for cathode active material to be contained in the cathode. The plate-like particle of cathode active material for a lithium secondary battery of the present invention has a layered rock salt structure, a thickness of 5 μm or more and less than 30 μm, 2 or less of [003]/[104] which is a ratio of intensity of X-ray diffraction by the (003) plane to intensity of X-ray diffraction by the (104) plane, a mean pore size of 0.1 to 5 μm, and a voidage of 3% or more and less than 15%.

12 Claims, 3 Drawing Sheets

(51) Int. Cl.
*C01G 53/00* (2006.01)
*C01G 53/04* (2006.01)
*H01M 4/525* (2010.01)
*H01M 10/0525* (2010.01)

(56) References Cited

U.S. PATENT DOCUMENTS

| | | | |
|---|---|---|---|
| 2004/0126660 A1* | 7/2004 | Ohzuku et al. | 429/223 |
| 2005/0079417 A1 | 4/2005 | Kim et al. | |
| 2005/0142442 A1* | 6/2005 | Yuasa et al. | 429/220 |
| 2005/0221180 A1 | 10/2005 | Shimura et al. | |
| 2006/0035151 A1* | 2/2006 | Kumeuchi et al. | 429/231.1 |
| 2006/0105239 A1* | 5/2006 | Paulsen et al. | 429/231.3 |
| 2008/0096111 A1 | 4/2008 | Ohzuku et al. | |
| 2008/0193844 A1 | 8/2008 | Ohzuku et al. | |
| 2008/0268347 A1* | 10/2008 | Ohzuku et al. | 429/322 |
| 2009/0104517 A1* | 4/2009 | Yuasa et al. | 429/158 |
| 2010/0159325 A1 | 6/2010 | Sugiura et al. | |
| 2010/0159326 A1 | 6/2010 | Sugiura et al. | |
| 2010/0159329 A1 | 6/2010 | Sugiura et al. | |
| 2010/0159330 A1 | 6/2010 | Sugiura et al. | |
| 2010/0159332 A1 | 6/2010 | Sugiura et al. | |
| 2010/0159333 A1 | 6/2010 | Sugiura et al. | |
| 2010/0173204 A1 | 7/2010 | Sugiura et al. | |
| 2011/0003206 A1* | 1/2011 | Yura et al. | 429/224 |

FOREIGN PATENT DOCUMENTS

| | | |
|---|---|---|
| JP | 09-022693 A1 | 1/1997 |
| JP | 2000-323123 A1 | 11/2000 |
| JP | 2004-172114 A1 | 6/2004 |
| JP | 2005-072008 A1 | 3/2005 |
| JP | 2008-078146 A1 | 4/2008 |
| JP | 2009-117261 A1 | 5/2009 |
| JP | 2009-295383 A1 | 12/2009 |
| JP | 2010-116302 A1 | 5/2010 |
| JP | 2010-129481 A1 | 6/2010 |
| JP | 2010-219069 A1 | 9/2010 |
| WO | 2010/074299 A1 | 7/2010 |

* cited by examiner

PLATE-LIKE PARTICLE OF CATHODE ACTIVE MATERIAL FOR LITHIUM SECONDARY BATTERY, CATHODE OF THE LITHIUM SECONDARY BATTERY AND LITHIUM SECONDARY BATTERY

BACKGROUND OF THE INVENTION

1. Field of the Invention

The present invention relates to a plate-like particle of cathode active material for lithium secondary battery, a cathode of a lithium secondary battery and a lithium secondary battery.

2. Description of the Related Art

A cathode active material for lithium secondary battery (may be referred to as a lithium ion secondary cell) using a plate-like particle of a lithium composite oxide (lithium transition metal oxide) having a layered rock salt structure is well-known (e.g., Japanese Patent Application Laid-Open (kokai) No. Hei 5-226004).

SUMMARY OF THE INVENTION

With respect to this kind of the plate-like particle, charge and discharge characteristics can be enhanced by means of exposure of the crystal plane through which lithium ions are intercalated and deintercalated (for example, the (104) plane) as much extent as possible to a plate surface. Also, filling ratio of cathode active material in a cathode can be raised and high capacity can be achieved by enlarging size (for example, to the extent of 5 μm or more and less than 30 μm in thickness) of the plate-like particle.

Meanwhile, impairment of capacity by repetition of charge-discharge cycles (may be referred to as impairment of cyclic characteristic) can occur in this kind of the lithium secondary battery. In order to elucidate the cause for the impairment, the cathode tested in an experiment example where the cyclic characteristic had been impaired were previously observed under an electron microscope. Through observation, cracks were found to be generated at the grain boundary in the plate-like particles (hereinafter, the cracks are referred to as "grain boundary cracks"). Furthermore, separation was found between a binder which contained an electroconducting aid such as carbon and the plate-like particles which were dispersed in the binder (hereinafter, the separation is referred to as "interface separation").

The grain boundary crack and the interface separation are thought to be caused by crystal lattice expansion/contraction associated with intercalation and deintercalation of lithium ions in charge-discharge cycles, wherein the crystal lattice expansion/contraction includes the expansion/contraction of volume and the expansion/contraction not involving change in volume. Thus, such grain boundary crack or interface separation, which results in generation of an electrically isolated portion (i.e., a portion which does not contribute to capacity) through breakage of an electrical conduction path in a cathode active material layer, to thereby reduce capacity, is thought to be a possible cause for deterioration in cycle characteristic.

The present invention was conceived in order to solve the aforementioned problems. That is, an object of the present invention is to provide a lithium secondary battery which has high capacity while maintaining excellent charge-discharge characteristic. Another object of the invention is to provide a cathode of the lithium secondary battery and a plate-like particle for cathode active material to be contained in the cathode.

<Configuration>

The plate-like particle of cathode active material for lithium secondary battery of the present invention (hereinafter may optionally be referred to simply as "plate-like particle") has a layered rock salt structure. The cathode of the lithium secondary battery of the present invention (hereinafter may be referred to simply as "cathode") has a cathode active material layer which contains the plate-like particles. Specifically, the cathode active material layer may be formed by dispersing the plate-like particles and the electroconducting aid in the binder. The lithium secondary battery of the present invention is comprised of the cathode; an anode which contains a carbonaceous material or a lithium-occluding material as anode active material; and an electrolyte provided so as to intervene between the positive electrode and the negative electrode.

"Layered rock salt structure" of the plate-like particle of cathode active material for lithium secondary battery of the present invention refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, α-NaFeO$_2$ type structure: structure in which a transition metal and lithium are arrayed orderly in the direction of the [111] axis of cubic rock salt type structure). The plate-like particle is typically comprised of lithium composite oxide. As used herein, the term "lithium composite oxide" refers to an oxide represented by Li$_x$MO$_2$ (0.05<x<1.10, M is at least one transition metal (typically, M includes one or more species of Co, Ni, and Mn)).

A characteristic feature of the present invention resides in that the plate-like particle has a thickness of 5 μm or more and less than 30 μm, peak intensity ratio [003]/[104] is 2 or less, a mean pore size of 0.1 to 5 μm, and a voidage of 3% or more and less than 15%. As used herein, peak intensity ratio [003]/[104] is the ratio of intensity of diffraction by the (003) plane to intensity of diffraction by the (104) plane.

Generally, the plate-like particle may be formed so as to have a ratio with of 3 or more, wherein t represents the thickness of the plate-like particle, and w represents the minimum size in the plate surface direction (direction orthogonal to the thickness direction).

The term "thickness direction" refers to the direction which defines the "thickness" t of the plate-like particle; typically, a direction parallel with the vertical direction in a state in which the plate-like particle is placed stably on a horizontal surface. The term "thickness" refers to the size of the plate-like particle as measured in the "thickness direction."

The term "plate surface" refers to a surface of the plate-like particle which is orthogonal or nearly orthogonal to the "thickness direction" of the sheet. Since the "plate surface" of the plate-like particle is the widest surface on the sheet, the "plate surface" may be referred to as the "principal surface." The term "plate surface direction" refers to a direction parallel with the "plate surface" (i.e., in-plane direction). Thus, the "thickness" of the plate-like particle is equivalent to the shortest distance between the generally parallel two plate surfaces of the sheet. The aforementioned "thickness direction" is the direction which defines the shortest distance between the two "plate surfaces."

Specifically, the thickness t of the plate-like particle is determined by, for example, measuring the distance between the generally parallel plate surfaces as observed in cross section under an SEM (scanning electron microscope). The minimum size in the plate surface direction "w" is determined by, for example, taking a plan view of the plate-like particle under an SEM, and measuring the diameter of the inscribed circle of the contour of the plan view.

The "mean pore size" is the mean diameter of the pores in the plate-like particle. The "diameter" is generally the diameter of an imaginary sphere under the assumption that each pore is reduced to a sphere having the same volume or cross-sectional area as that of the pore. According to the present invention, the "mean value" is preferably calculated on the number basis. The mean pore size may be obtained through, for example, a widely known method such as image processing of a cross-sectional SEM (scanning electron microscope) image or the mercury penetration method.

As used herein, the term "voidage" refers to the volume proportion of voids (pores: including open pores and closed pores) in the plate-like particle of the present invention. "Voidage" may also be referred to as "porosity." "Voidage" is calculated from, for example, bulk density and true density of the plate-like particle.

When the plate-like particle has a structure in which numerous primary particles (crystal particles) have been bound to one another, the primary particles preferably have a size (primary particle size) of 5 μm or less.

<Action and Effect>

The plate-like particle has a thickness of 5 μm or more but less than 30 μm and peak intensity ratio [003]/[104] is 2 or less (preferably 2 or less, more preferably 1.2 or less, still more preferably 0.6 or less). Then, filling ration of cathode active material in the cathode active material layer can be raised, and the crystal plane through which lithium ions are intercalated and deintercalated (for example, the (104) plane) can expose to a plate surface as much extent as possible. Therefore, high capacity and enhanced charge-discharge characteristic can be achieved. Additionally, cycle characteristic can be improved by above-mentioned mean pore size, voidage, and 2 or less in peak intensity ratio [003]/[104]. One possible reason for the improvement may be as follows.

The crystal lattice expansion/contraction (expansion/contraction in volume) associated with charge-discharge cycles occurs to the highest extent in a direction normal to the (003) plane (i.e., [003] direction). Therefore, grain boundary cracks caused by crystal lattice expansion/contraction associated with charge-discharge cycles readily occurs in a direction parallel to the (003) plane. Furthermore, the (003) plane is a closest packing plane in terms of oxygen and does not allow lithium ions and electrons to enter and exit the crystal lattice. Thus, the (003) plane is chemically and electrochemically inert plane.

In this regard, as described above, when the peak intensity ratio [003]/[104] is 2 or less, there is reduced the ratio of the (003) plane which is developed to a plate surface of the plate-like particle, or the ratio of the (003) plane which is oriented in the direction parallel to the plate surface in the plate-like particle. Because of this, grain boundary crack occurring in a direction parallel to the plate surface, which would impair inter alia the capacity, can be effectively prevented. Also, the bonding strength increased at the bonding interface with the binder, to thereby prevent interface separation.

Also, as described above, the plate-like particle includes pores having a specific size at a specific ratio. Therefore, the stress generated by crystal lattice expansion/contraction associated with intercalation and deintercalation of lithium ions in charge-discharge cycles is favorably (uniformly) released by the pores. As a result, grain boundary crack associated with repeated charge-discharge cycles can be prevented to the possible extent. In addition, by virtue of the pores (open pores) present at the bonding interface with the binder, the bonding strength is enhanced. As a result, deformation of the plate-like particle caused by crystal lattice expansion/contraction associated with intercalation and deintercalation of lithium ions in charge-discharge cycles can be prevented, whereby the aforementioned interface separation is more favorably prevented.

Furthermore, the number of grain boundaries increases by small primary particle size (specifically 5 μm or less), and the internal stress generated by crystal lattice expansion/contraction associated with charge-discharge cycles is more favorably scattered as the number of grain boundaries increases. Also, with respect to grain boundary cracks, propagation of crack is effectively prevented in the presence of a large number of grain boundaries. Thus, the cycle characteristic is further enhanced by the configuration.

As stated above, according to the present invention, the capacity can be enhanced, while favorable charge-discharge characteristics including cycle characteristic are maintained.

Meanwhile, when the mean pore size is in excess of 5 μm, relatively large pores are provided. Such larger pores are generally not in the form of complete sphere but in the form of deformed sphere. Therefore, stress concentration is likely to occur locally in the larger pores, and the effect of uniformly releasing the stress in the particle is difficult to attain. When the mean pore size is less than 0.1 μm or the voidage is less than 3%, the stress releasing effect by the pores is insufficient. Thus, in both cases, grain boundary crack is not satisfactorily prevented. Furthermore, in both cases, the effect of enhancing the bonding strength to the binder is impeded, and above-mentioned interface separation is not satisfactorily prevented.

For example, lithium cobaltate expands its volume upon charge (i.e., deintercalation of lithium ions), whereas lithium nickelate expands its volume upon discharge (i.e., intercalation of lithium ions). Therefore, volume expansion/contraction upon charge-discharge cycles can be apparently reduced to zero by appropriately adjusting the compositional proportion of cobalt or nickel. However, even in this case, lattice length changes. Specifically, $Li(Co_{0.5}Ni_{0.5})O_2$ expands in a c-axis direction and contracts in an a-axis direction.

Therefore, the present invention is very effectively applied to the plate-like particle having the following composition: a lithium composite oxide having a layered rock salt structure (e.g., lithium cobaltate $Li_pCoO_2$ [wherein $1 \leq p \leq 1.1$], lithium nickelate $LiNiO_2$, lithium manganate $Li_2MnO_3$, lithium nickel manganate $Li_p(Ni_{0.5}, Mn_{0.5})O_2$, a solid solution thereof represented by the formula $Li_p(CO_x, Ni_x, Mn_z)O_2$ [wherein $0.97 \leq p \leq 1.07$, $x+y+z=1$], $Li_p(CO_x, Ni_y, Al_z)O_2$ [wherein $0.97 \leq p \leq 1.07$, $x+y+z=1$, $0<x \leq 0.25$, $0.6 \leq y \leq 0.9$, $0<z \leq 0.1$], or a solid solution of $Li_2MnO_3$ and $LiMO_2$ (M is a transition metal such as Co or Ni)). The plate-like particle of the present invention may contain one or more elements selected from among, for example, Mg, Al, Si, Ca, Ti, V, Cr, Fe, Cu, Zn, Ga, Ge, Sr, Y, Zr, Nb, Mo, Ag, Sn, Sb, Te, Ba, and Bi, so long as any of the aforementioned formulas is satisfied.

Also, the present invention is particularly effectively applied to the case of a composition exhibiting increased volume expansion/contraction; for example, $Li_p(CO_x, Ni_x, Mn_z)O_2$ wherein the proportion by mole of nickel is 0.75 or more or the proportion by mole of cobalt is 0.9 or more, or $Li_p(CO_x, Ni_x, Al_z)O_2$ wherein the proportion by mole of nickel is 0.7 or more.

DETAILED DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law. Thus, as will be described later, naturally, the present invention is not limited to the specific configurations of embodiments and examples to be described below. Modifications that can be made to the embodiments and examples are collectively described herein principally at the end, since insertion thereof into the description of the embodiments would disturb understanding of consistent description of the embodiments.

<Configuration of Lithium Secondary Battery>

Figure 1:
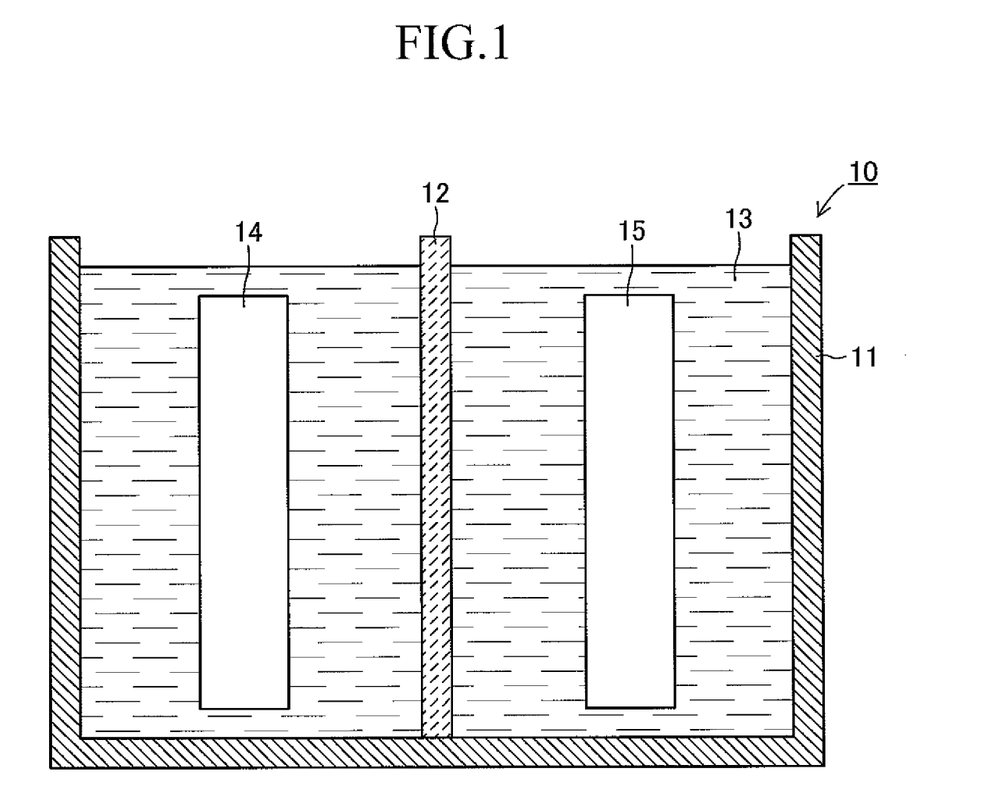
FIG. 1 is a sectional view of the schematic configuration of an embodiment of the lithium secondary battery of the present invention.

FIG. 1 is a sectional view of the schematic configuration of an lithium secondary battery 10 to which an embodiment of the present invention is applied. Referring to FIG. 1, the lithium secondary battery 10 of the embodiment has a cell casing 11, a separator 12, an electrolyte 13, an anode 14, and a cathode 15.

The separator 12 is provided so as to halve the interior of the cell casing 11 into the anode 14 section and the cathode 15 section. That is, the anode 14 and the cathode 15 are provided within the cell casing 11 in such a manner as to face each other with the separator 12 located therebetween. The cell casing 11 accommodates the electrolyte 13.

The electrolyte 13 which may be in the present invention is preferably a liquid electrolyte from the viewpoints, for example, electrical characteristics and easy handlability. The liquid electrolyte which may be employed in the present invention is preferably a nonaqueous-solvent-type which is prepared by dissolving an electrolyte salt such as a lithium salt in a nonaqueous solvent such as an organic solvent. The electrolyte 13 may be a polymer electrolyte, a gel electrolyte, an organic solid electrolyte, or an inorganic solid electrolyte, and no problem arises when such an electrolyte is employed.

No particular limitation is imposed on the solvent for the nonaqueous electrolytic solution. Examples of the solvent include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. Among them, a mixed solvent containing a chain ester serving as a main solvent with a cyclic ester is particularly preferred.

Examples of the electrolyte salt to be dissolved in the above-mentioned nonaqueous solvent include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3$ (n≥2), and $LiN(RfOSO_2)_2$ [Rf and Rf' each represent a fluoroalkyl group]. They may be used singly or in combination of two or more species.

Among the above-mentioned electrolyte salts, a fluorine-containing organic lithium salt having a carbon number of 2 or greater is particularly preferred. This is because the fluorine-containing organic lithium salt is high in anionic property and readily undergoes electrolytic dissociation, and is thus readily dissolvable in the above-mentioned solvent. No particular limitation is imposed on the electrolyte salt concentration of the nonaqueous electrolytic solution (electrolyte 13). However, for example, the concentration is 0.3 mol/L to 1.7 mol/L, more preferably 0.4 mol/L to 1.5 mol/L.

Any anode active material may be used in the anode 14, so long as the material can occlude and release lithium ions. For example, there may be used carbonaceous materials (e.g., graphite, pyrolytic carbon, coke, glassy carbon, a fired product of organic polymer compound, mesocarbon microbeads, carbon fiber, and activated carbon). Further, a portion of graphite may be replaced with a metal which can be alloyed with, for example, lithium or an oxide. Also, there may be used, as the anode active material, metallic lithium; an alloy which contains metallic lithium and another element (e.g., silicon, tin, or indium); an oxide of silicon, tin, or the like which can perform charge and discharge at low electric potential near that at which lithium does; and a lithium-occluding material such as a lithium cobalt nitride (e.g., $Li_{2.6}CO_{0.4}N$).

When graphite is employed as the anode active material, the voltage at full charge can be considered to be about 0.1 V (vs. lithium). Thus, the electric potential of the cathode 15 can be conveniently calculated as a cell voltage plus 0.1 V. Therefore, since the electric potential of the cathode 15 at charging is readily controlled, graphite is preferred.

Figure 2:
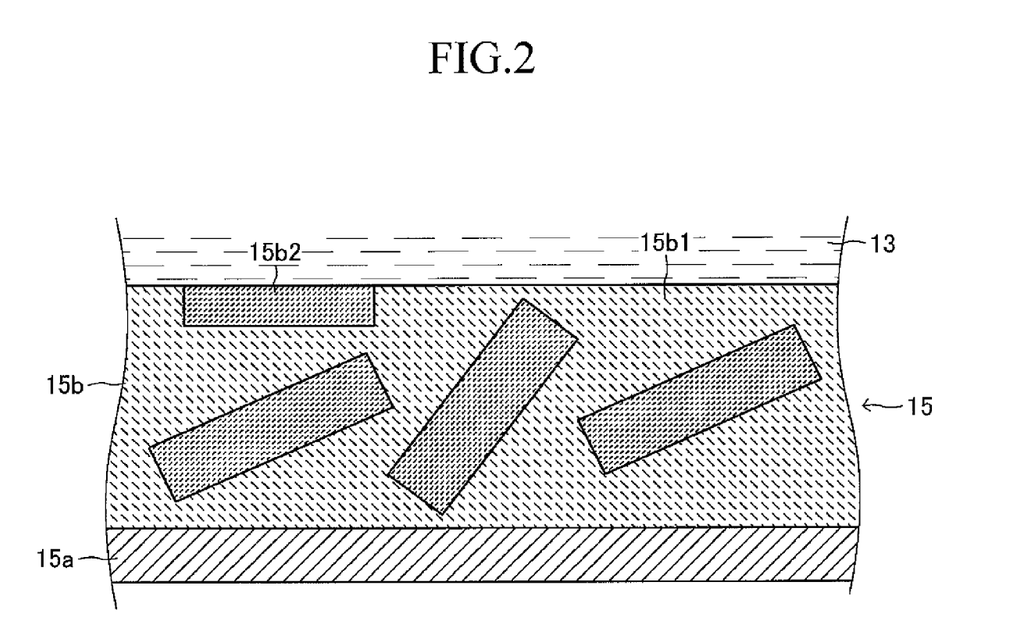
FIG. 2 is an enlarged sectional view of the cathode shown in FIG. 1.

FIG. 2 is an enlarged sectional view of the cathode 15 shown in FIG. 1. Referring to FIG. 2, the cathode 15 includes a cathode collector 15a and a cathode active material layer 15b. The cathode active material layer 15b is comprised of a binder 15b1 and dispersed materials including a plate-like particle 15b2 of cathode active material and an electroconducting aid such as carbon, and is bonded to the cathode collector 15a. The plate-like particle 15b2 of cathode active material of the present invention is composed of a sintered lithium composite oxide sheet and has a thickness of 5 μm or more and less than 30 μm, a mean pore size of 0.1 to 5 μm, and a voidage of 3% or higher and less than 15%.

Figure 3:
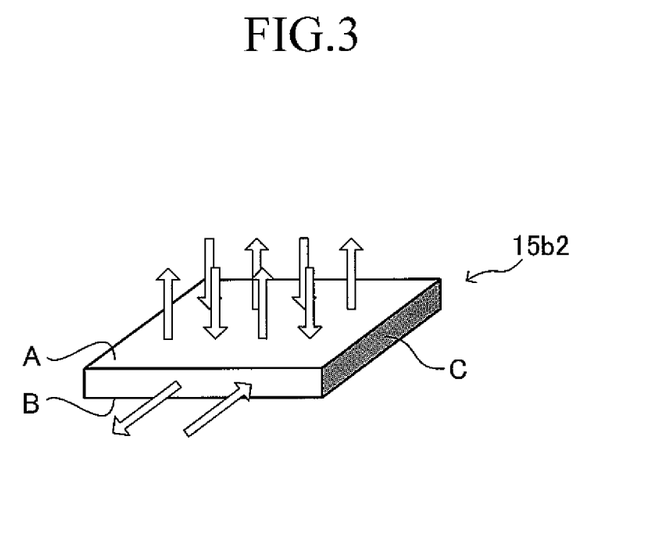
FIG. 3 is an enlarged perspective view of a plate-like particle of cathode active material shown in FIG. 2.

FIG. 3 is an enlarged perspective view of the plate-like particle 15b2 of cathode active material shown in FIG. 2. As shown in FIG. 3, the plate-like particle 15b2 of cathode active material is formed such that a plane other than the (003) plane (e.g., the (101) plane or the (104) plane) is exposed at a plate surface (upper surface A and lower surface B: hereinafter, the "upper surface A" and the "lower surface B" are referred to as the "plate surface A" and the "plate surface B," respectively), which is a surface normal to the thickness direction (the vertical direction in the drawings).

Specifically, the plate-like particle 15b2 of cathode active material of the present invention is formed such that the ratio of intensity of X-ray diffraction by the (003) plane to intensity of X-ray diffraction by the (104) plane; i.e., the peak intensity ratio [003]/[104] falls within a range of 2 or less. The (003) planes (colored black in the drawing) may be exposed at the end surfaces C, which intersect the plate surface direction (in-plane direction).

<Summary of Method for Producing the Plate-Like Particle of Cathode Active Material>

The plate-like particle 15b2 of cathode active material is readily and reliably formed through, for example, the following production method.

1. Preparation of Raw Material Particles

Particles of a transition metal (e.g., Co, Ni, or Mn) compound containing no lithium compound are employed as raw material particles. The raw material particles may be appropriately pulverized and classified. In consideration of a composition of interest, a plurality of types of raw material particles may be appropriately mixed together. The raw material particles may be mixed with a low-melting-point oxide (e.g., boron oxide, bismuth oxide, or antimony oxide), a low-melting-point chloride (e.g., sodium chloride or potassium chloride), or a low-melting-point glass material (e.g., borosilicate glass) in an amount of 0.001 to 30 wt. % for the purpose of promoting grain growth.

To the raw material particles, an additive for forming pores having a size and voidage of interest as mentioned above; i.e., a pore-forming material may be added, followed by uniformly mixing. The pore-forming material is preferably a particulate or fibrous substance which decomposes (vaporizes or is carbonized) in the subsequent calcination step. Specific examples of preferably employed pore-forming materials include theobromine, graphite, and organic synthetic resins such as nylon, phenolic resin, poly(methyl methacrylate), polyethylene, poly(ethylene terephthalate), and foamable resin, in the form of particle or fiber. Needless to say, if no such a pore-forming material is added, the pores having a size and voidage of interest as mentioned above can be formed through appropriately tuning the particle size of the raw material particles, the firing temperature employed in the calcination step, etc.

2. Raw Material Particle Sheet Forming Step

Raw material particles or a mixture thereof is subjected to a sheet forming step, to thereby form an "independent" sheet-like compact. As used herein, "independent" sheet (may be referred to as "self-standing film") refers to a sheet which is independent of another support and can be handled by itself. The term "independent sheet-like compact" also means thin tablets having an aspect ratio of 5 or higher. Therefore, "independent" sheet does not include a sheet bonded to and integrated with another support (e.g., substrate) (i.e., impossible or difficult to separate from the support).

Sheet forming may be carried out through any well known technique. Specifically, sheet forming may be performed by means of, for example, a doctor blade-type sheet forming machine (doctor blade method), a drum dryer, a disk dryer, or a screen printing machine. The thickness of a sheet-like compact is appropriately determined so as to attain the aforementioned preferred thickness after firing.

3. Compact Calcination Step

The sheet-like compact formed through the aforementioned forming step is fired at a relatively low temperature (e.g., 700 to 1,200° C.) before the below-described lithium incorporation step. This calcination step forms a porous sheet-like intermediate fired compact containing numerous pores of relatively large size. This calcination step is carried out in air in a state where, for example, the above-formed sheet-like compact is placed on a zirconia-made embossed setter.

4. Lithium Incorporation Step

A lithium compound is applied to the intermediate fired compact obtained through the aforementioned calcination step, followed by thermal treatment, whereby lithium is incorporated into the intermediate fired compact. Thus, there is produced an "independent" sintered lithium composite oxide sheet for a cathode active material layer. The lithium incorporation step is carried out in, for example, a crucible.

Examples of the employable lithium compound include lithium salts such as lithium carbonate, lithium nitrate, lithium peroxide, lithium hydroxide, lithium acetate, lithium chloride, lithium oxalate, and lithium citrate; and lithium alkoxides such as lithium methoxide and lithium ethoxide. The lithium compound is added so that, in the sheet-like sintered compact represented by the formula $Li_xMO_2$, the ratio by mole of lithium to M (i.e., Li/M) is 1 or more.

When lithium is incorporated into the porous sheet-like intermediate fired compact yielded in the aforementioned calcination step, the pore size of the intermediate fired compact is decreases, whereby the aforementioned pores having a size and voidage of interest are formed.

5. Crushing Step

The above-mentioned sheet is crushed into a large number of plate-like particles before or after the above lithium incorporation step. For example, the crushing step may be performed by placing the above-mentioned sheet on a mesh having a predetermined mesh size and then press the sheet from above by a spatula.

<Evaluation Method and Results>

For the evaluation of cell characteristics, a coin cell having the same shape as that of a type CR2032 cell was fabricated in the following manner.

The yielded positive electrode, a negative electrode formed from a lithium metal plate, stainless steel collector plates, and a separator were arranged in the order of collector plate—positive electrode—separator—negative electrode—collector plate. The resultant laminate was filled with an electrolytic solution, thereby yielding a coin cell. The electrolytic solution was prepared as follows: ethylene carbonate (EC) and diethyl carbonate (DEC) were mixed at a volume ratio of 1:1 so as to prepare an organic solvent, and $LiPF_6$ was dissolved in the organic solvent at a concentration of 1 mol/L.

The thus-fabricated coin cell was evaluated in terms of cycle characteristic (percent capacity retention).

Cycle Characteristic (Percent Capacity Retention):

The fabricated cell was subjected to cyclic charge-discharge at a test temperature of 20° C. The cyclic charge-discharge repeats: (1) charge at 1 C rate of constant current and constant voltage until 4.2 V is reached, and (2) discharge at 1 C rate of constant current until 3.0 V is reached. By dividing the discharge capacity of the cell as measured after the cyclic charge-discharge by the initial discharge capacity of the cell and being multiplied by 100, percent capacity retention (%) was obtained.

EXAMPLES

The present invention will next be described in more detail by way of specific examples of the above-mentioned plate-like particle 15b2 of cathode active material. Evaluations of the particles are also described.

Example 1

Specific Example 1

Cobalt-Based Composition

Producing conditions in Experiment Examples 1-1 to 1-9, where the plate-like particles 15b2 of cathode active material is $LiCoO_2$ ceramic particles, are shown in Table 1.

TABLE 1

|  | Material particle size (μm) | Intermediate firing temp. (° C.) | Pore-forming material shape/amount (wt. parts) |
|---|---|---|---|
| Exp. Ex. 1-1 | 0.3 | 1,100 | 0 |
| Exp. Ex. 1-2 | 1.0 | 1,100 | 0 |
| Exp. Ex. 1-3 | 0.5 | 1,000 | fibrous/5 |
| Exp. Ex. 1-4 | 1.0 | 1,000 | spherical/5 |
| Exp. Ex. 1-5 | 1.0 | 900 | spherical/10 |
| Exp. Ex. 1-6 | 0.5 | 1,100 | 0 |

TABLE 1-continued

| | Material particle size (μm) | Intermediate firing temp. (° C.) | Pore-forming material shape/amount (wt. parts) |
|---|---|---|---|
| Exp. Ex. 1-7 | 0.1 | 1,200 | 0 |
| Exp. Ex. 1-8 | 3.0 | 1,100 | 0 |
| Exp. Ex. 1-9 | | | |

The detailed production conditions employed in Experiment Examples 1-1, 1-2, and 1-6 to 1-8 shown in Table 1 are as follows.

(1) Preparation of Slurry $Co_3O_4$ powder (particle size: 1 to 5 μm; product of Seido Kagaku Kogyo Co., Ltd.) was crushed and classified to prepare $Co_3O_4$ raw material powder. The $Co_3O_4$ raw material powder (100 parts by weight) was mixed with a dispersion medium (toluene:isopropanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl) phthalate, product of Kurogane Kasei Co., Ltd.) (4 parts by weight), and a dispersant (trade name "RHEODOL SP-O30," product of Kao Corporation) (2 parts by weight). The resultant mixture was stirred under reduced pressure for defoaming, and the viscosity thereof was adjusted to 3,000 to 4,000 cP. The viscosity was measured by means of an LVT-type viscometer (product of Brookfield) in Specific Example 1 and other Examples.

(2) Sheet Forming

The thus-prepared slurry was formed into a sheet-like compact on a PET film through the doctor blade method so that the thickness of the compact as measured after drying was adjusted to 20 μM.

(3) Calcination

The sheet-like compact was removed from the PET film. 20 g of compact was crumpled and placed in a sheath made of alumina (dimensions: 150 mm square×10 mm in height), and then heated in air at a specific temperature (firing temperature for yielding an intermediate fired product) for 5 hours. Thereafter, the piece was cooled at 200° C./h to room temperature. Then, a portion of the piece which was not fused to the sheath was picked up, to thereby produce fake-like fired compact.

(4) Pulverization

The thus-removed fired compact (50 g), nylon balls (diameter: 10 mm) (370 g), and ethanol (165 g) were placed in a polypropylene-made pot (volume: 1 L) and mixed for 20 hours for pulverization.

(5) Lithium Incorporation

The thus-obtained $Co_3O_4$ powder was mixed with $Li_2CO_3$ powder (product of Kanto Chemical Co., Inc.) so that Li/Co was 1.0, and the mixture was thermally treated in an oxygen atmosphere (0.1 MPa) at 760° C. for 20 hours, to thereby produce plate-like $LiCoO_2$ powder particles (plate-like particles 15b2 of cathode active material) having a thickness of 20 μm.

The detailed production conditions employed in Experiment Examples 1-3 to 1-5 shown in Table 1 are as follows.

A slurry was prepared through the same procedure employed in, for example, Experiment Example 1-1, except that a pore-forming material was added. As the pore-forming material, a fibrous material (Celish PC10S, product of Daicel FineChem LTd.) or a spherical material (Nylon powder, product of Sumitomo Environ Science) was employed. The thus-prepared slurry was formed into a sheet on a PET film in the same manner as employed in, for example, Experiment Example 1-1.

The sheet-like compact was removed from the PET film. 20 g of compact was crumpled and placed in a sheath made of alumina (dimensions: 150 mm square×10 mm in height), and then heated in air at 900° C. (firing temperature for yielding an intermediate fired product) for 10 hours. Thereafter, the piece was cooled at 200° C./h. Then, a portion of the piece which was not fused to the sheath was picked up and pulverized. Lithium was incorporated into the thus-obtained $Co_3O_4$ ceramic powder in the same manner as employed in, for example, Experiment Example 1-1, to thereby produce plate-like $LiCoO_2$ powder particles (plate-like particles 15b2 of cathode active material) having a thickness of 20 μm.

The detailed production conditions employed in Experiment Example 1-9 shown in Table 1 are as follows.

Specifically, $Li_2CO_3$ and $Co_3O_4$ were mixed together so that the Li/Co ratio was adjusted to 1.0, and the mixture was heated in air at 800° C. for 24 hours, to thereby yield an $LiCoO_2$ powder. The powder was subjected to further crushing, to thereby adjust the mean particle size to 5.0 μm. The thus-obtained powder was formed into a sheet in the same manner as employed in Experiment Examples 1-1, 1-2, and 1-6 to 1-8. Each sheet was heated in air at 900° C. for 10 hours, and then cooled at 200° C./h. Then, a portion of the sheet which was not fused to the sheath was picked up and pulverized, to thereby produce powder-like $LiCoO_2$ particles.

Table 2 shows the evaluation results of Experiment Examples shown in Table 1. In Table 2, the term "percent capacity retention" was obtained from the capacity after completion of 50 charge-discharge cycles. The "voidage" was obtained by dividing the bulk density of each sintered sheet (measured through the Archimedes' method) by the true density thereof (measured by means of a pycnometer), to thereby obtain the relative density, and subtracting the relative density from 1. In the measurement of bulk density, the tested sintered sheet was boiled in water in order to sufficiently remove air remaining in the pores. When the sample had a small pore size, the pores of the sample were impregnated in advance with water by means of a vacuum impregnation apparatus (CitoVac, product of Struers), and the thus-treated sample was subjected to boiling treatment. The "mean pore size" was measured through the mercury penetration method by means of a mercury penetration micropore distribution analyzer "AutoPore IV9510," product of Shimadzu Corporation.

TABLE 2

| | Voidage (%) | Mean pore size (μm) | Percent capacity retention (%) |
|---|---|---|---|
| Exp. Ex. 1-1 | 3 | 0.1 | 90 |
| Exp. Ex. 1-2 | 3.1 | 5 | 87 |
| Exp. Ex. 1-3 | 8 | 0.3 | 92 |
| Exp. Ex. 1-4 | 7.8 | 5 | 88 |
| Exp. Ex. 1-5 | 14.9 | 4.8 | 94 |
| Exp. Ex. 1-6 | 2.3 | 3.1 | 40 |
| Exp. Ex. 1-7 | 2.7 | 0.06 | 63 |
| Exp. Ex. 1-8 | 2.9 | 8 | 55 |
| Exp. Ex. 1-9 | 24 | 7 | 90 |

As is clear from Tables 1 and 2, the sintered sheets of Experiment Examples 1-1 to 1-5, which had a mean pore size of 0.1 to 5 μm and a voidage of 3% or higher and lower than 15%, exhibited excellent percent capacity retention, even after completion of 50 charge-discharge cycles. In contrast, the plate-like particles of Experiment Examples 1-6 to 1-8, which had a voidage and mean pore size lower than the lower limit of the aforementioned range, exhibited considerably impaired cyclic characteristic (i.e., percent capacity retention after completion of 50 charge-discharge cycles), as compared with those of Experiment Examples 1-1 to 1-5. One possible reason therefor is as follows.

The sintered sheets of Experiment Examples 1-1 to 1-5 each include pores having a specific pore size at a specific proportion. Therefore, the stress generated by crystal lattice expansion/contraction associated with intercalation and deintercalation of lithium ions in charge-discharge cycles is favorably (uniformly) released. As a result, grain boundary crack associated with charge-discharge cycles can be prevented to the possible extent. In addition, since the bonding strength of the boundary between the plate-like particle 15b2 of cathode active material and the binder 15b1 is enhanced, the aforementioned interface separation is effectively prevented. Thus, according to the sintered sheets of Experiment Examples 1-1 to 1-5, the capacity of the cell employing each sintered sheet can be enhanced, while favorable cycle characteristic is maintained.

Meanwhile, in Experiment Examples 1-7 and 1-8, in which the mean pore size is in excess of 5 μm, relatively large pores are provided. Such larger pores are generally not in the form of complete sphere but in the form of deformed sphere. Therefore, stress concentration is likely to occur locally in the larger pores, and the effect of uniformly releasing the stress in the sintered sheet is difficult to attain. In Experiment Examples 1-6 and 1-7, in which the mean pore size is less than 0.1 μm or the voidage is less than 3%, the stress releasing effect by the pores is insufficient. Thus, in both cases, grain boundary crack is not satisfactorily prevented. Furthermore, in both cases, the effect of enhancing the bonding strength between the plate-like particle of cathode active material and the binder is impeded, and interface separation is not satisfactorily prevented.

Meanwhile, if voids are performed without forming an intermediate fired product or incorporation of lithium into the intermediate, or without adding a pore-forming material, the voidage excessively increases as shown in Experiment Example 1-9, failing to attain high capacity. That is, conceivably, although apparently excellent cycle characteristic is attained, a drop in percent capacity retention is not clearly observed due to excessively low initial capacity caused by excessively low filling ratio. The same consideration may be applicable to the fact that high percent capacity retention is attained, although the mean pore size is greater than the upper limit of the aforementioned specific range.

Next, the ratio of intensity of X-ray diffraction by the (003) plane to intensity of X-ray diffraction by the (104) plane; i.e., the peak intensity ratio [003]/[104] was evaluated. XRD (X-ray diffraction) was carried out though the following procedure.

Specifically, a ceramic sheet for the cathode active material layer, which had been worked to a ϕ of about 5 to about 10 mm, was placed on a sampler holder for XRD. By means of an XRD apparatus (RINT-TTR III, product of Rigaku Corp.), the surface of the ceramic sheet for the cathode active material layer was irradiated with X-ray so as to measure an XRD profile, thereby obtaining the ratio of intensity (peak height) of diffraction by the (003) plane to intensity (peak height) of diffraction by the (104) plane, [003]/[104]. Thus, according to the above-mentioned method, there is obtained a profile of diffraction by crystal faces present in parallel with crystal faces of the plate surface; i.e., a profile of diffraction by crystal faces oriented in a plate surface direction.

In order to evaluate the influence of the peak intensity ratio [003]/[104], sintered sheet samples of Experiment Examples 1-10 to 1-14, which had the same voidage and pore size but varied orientation degrees, were produced. In Experiment Examples 1-10 to 1-14, the same raw material particle size and firing temperature for yielding an intermediate fired product as employed in Experiment Example 1-4 were employed, whereby the same voidage and pore size (voidage: 8%, mean pore size; 5 μm) as employed in Experiment Example 1-4 were realized. However, lithium introduction conditions (i.e., type and amount of lithium compound, and treatment temperature: see, Table 3) were appropriately modified, to thereby vary the orientation degree. Table 4 shows the results.

TABLE 3

|  | Li compd. | Li/M mole ratio | Li incorporation temp. (° C.) |
|---|---|---|---|
| Exp. Ex. 1-10 | $Li_2O_2$ | 1 | 775 |
| Exp. Ex. 1-11 | $LiNO_3$ | 1 | 800 |
| Exp. Ex. 1-12 | $LiNO_3$ | 1.2 | 840 |
| Exp. Ex. 1-13 | $Li_2CO_3$ | 5 | 870 |
| Exp. Ex. 1-14 | $Li_2CO_3$ | 10 | 900 |

TABLE 4

|  | Voidage (%) | Mean pore size (μm) | [003]/[104] peak intensity ratio | Percent capacity retention (%) |
|---|---|---|---|---|
| Exp. Ex. 1-10 | 7.8 | 5 | 0.6 | 93 |
| Exp. Ex. 1-11 | 7.8 | 5 | 0.8 | 90 |
| Exp. Ex. 1-12 | 7.8 | 5 | 1.2 | 88 |
| Exp. Ex. 1-13 | 7.8 | 5 | 3 | 72 |
| Exp. Ex. 1-14 | 7.8 | 5 | 10 | 60 |

As is clear from Table 4, in Experiment Examples 1-10 to 1-12, in which the peak intensity ratio [003]/[104] was 2 or lower, excellent cycle characteristic was attained. In contrast, in Experiment Examples 1-13 and 1-14, in which the peak intensity ratio [003]/[104] was in excess of 2, cycle characteristic was impaired.

When the plate-like particle 15b2 of cathode active material of the embodiment has a structure in which numerous primary particles (crystal particles) have been bound to one another. Thus, in order to evaluate the influence of the primary particle size, there were produced ceramic sheet samples of Experiment Examples 1-15 to 1-19 having different primary particle sizes at a constant voidage and pore size. In Experiment Examples 1-15 to 1-19, the ceramic sheet samples having different primary particle sizes were formed by appropriately modifying conditions employed in incorporation of lithium (i.e., type and amount of lithium compound and treatment temperature, see Table 5), while the voidage and pore size were maintained by controlling, to constant values, the raw material particle size and firing temperature for yielding an intermediate fired product.

TABLE 5

|  | Li compd. | Li/M mole ratio | Li incorporation temp. (° C.) |
|---|---|---|---|
| Exp. Ex. 1-15 | $Li_2O_2$ | 1 | 775 |
| Exp. Ex. 1-16 | $LiNO_3$ | 1 | 800 |
| Exp. Ex. 1-17 | $LiNO_3$ | 1.2 | 840 |
| Exp. Ex. 1-18 | $LiNO_3$ | 2 | 870 |
| Exp. Ex. 1-19 | $LiNO_3$ | 3 | 900 |

The primary particle size was determined through the following procedure. Specifically, a sample for observation under an electron microscope was prepared by thinning a ceramic sheet for a cathode active material layer to a thickness of about 80 nm through FIB (focused ion beam) working. The sample had a cross section in parallel with the plate surface of the ceramic sheet. The magnification of the transmission electron microscope was adjusted so that 10 or more primary particles were included in a vision field, and a bright-field image of the sample was taken. An inscribed circle was drawn in each of the 10 primary particles observed in the bright-field image, and the diameter of the inscribed circle was determined. The thus-obtained diameters were averaged, to thereby obtain a primary particle size. The evaluation results of Experiment Examples 1-15 to 1-19 are shown in Table 6.

TABLE 6

| | Voidage (%) | Mean pore size (μm) | Primary particle size (μm) | Percent capacity retention (%) |
|---|---|---|---|---|
| Exp. Ex. 1-15 | 7.8 | 5 | 0.4 | 93 |
| Exp. Ex. 1-16 | 7.8 | 5 | 1.8 | 91 |
| Exp. Ex. 1-17 | 7.8 | 5 | 3.2 | 88 |
| Exp. Ex. 1-18 | 7.8 | 5 | 4.8 | 82 |
| Exp. Ex. 1-19 | 7.8 | 5 | 7 | 60 |

As is clear from Table 6, the ceramic sheet samples of Experiment Examples 1-15 to 1-18, having a primary particle size of 5 μm or less, exhibited a favorable cycle characteristic. In contrast, the ceramic sheet sample of Experiment Example 1-19, having a primary particle size in excess of 5 μm, exhibited an impaired cycle characteristic.

Example 2

Specific Example 2

Nickel-Based Composition

Also, producing conditions in Experiment Examples 2-1 to 2-10, where the plate-like particles 15b2 of cathode active material is Li(Ni,Co,Al)O$_2$ ceramic particles, are shown in Table 7.

TABLE 7

| | Material particle size (μm) | Intermediate firing temp. (° C.) | Pore-forming material shape/amount (wt. parts) |
|---|---|---|---|
| Exp. Ex. 2-1 | 0.2 | 1,000 | 0 |
| Exp. Ex. 2-2 | 0.7 | 1,000 | 0 |
| Exp. Ex. 2-3 | 0.3 | 900 | fibrous/5 |
| Exp. Ex. 2-4 | 0.7 | 900 | spherical/5 |
| Exp. Ex. 2-5 | 0.2 | 700 | fibrous/10 |
| Exp. Ex. 2-6 | 0.7 | 800 | spherical/10 |
| Exp. Ex, 2-7 | 0.2 | 1,000 | 0 |
| Exp. Ex. 2-8 | 0.1 | 1,100 | 0 |
| Exp. Ex. 2-9 | 2.0 | 1,000 | 0 |
| Exp. Ex. 2-10 | | | |

The detailed production conditions employed in Experiment Examples 2-1, 2-2, and 2-7 to 2-9 shown in Table 7 are as follows.
(1) Preparation of Slurry
NiO powder (particle size: 1 to 10 μm; product of Seido Kagaku Kogyo Co., Ltd.) (75.1 parts by weight), CO$_3$O$_4$ powder (particle size: 1 to 5 μm; product of Seido Kagaku Kogyo Co., Ltd.) (21.5 parts by weight), and Al$_2$O$_3$ powder (particle size: 1 to 10 μm; product of Showa Denko K.K.) (3.4 parts by weight) were mixed together and pulverized, and the resultant mixture was thermally treated in air at 1,000° C. for five hours, to thereby synthesize (Ni$_{0.75}$, CO$_{0.2}$, Al$_{0.05}$)O powder.

The thus-synthesized powder was pulverized by means of a pot mill, and the resultant (Ni$_{0.75}$, CO$_{0.2}$, Al$_{0.05}$)O raw material particles (100 parts by weight) were mixed with a dispersion medium (toluene:isopropanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl) phthalate, product of Kurogane Kasei Co., Ltd.) (4 parts by weight), and a dispersant (trade name "RHEODOL SP-030," product of Kao Corporation) (2 parts by weight). The resultant mixture was stirred under reduced pressure for defoaming, and the viscosity thereof was adjusted to 3,000 to 4,000 cP.
(2) Sheet Forming The thus-prepared slurry was formed into a sheet-like compact on a PET film through the doctor blade method so that the thickness of the compact as measured after drying was adjusted to 20 μm.
(3) Calcination The sheet-like compact was removed from the PET film. 20 g of compact was crumpled and placed in a sheath made of alumina (dimensions: 150 mm square×10 mm in height), and then heating in air at a specific temperature (firing temperature for yielding an intermediate fired product) for 3 hours. Thereafter, the piece was cooled at 200° C./h to room temperature. Then, a portion of the piece which was not fused to the sheath was picked up.
(4) Pulverization The thus-removed fired compact (50 g), nylon balls (diameter: 10 mm) (370 g), and ethanol (165 g) were placed in a polypropylene-made pot (volume: 1 L) and mixed for 20 hours for pulverization.
(5) Lithium Incorporation The thus-obtained (Ni$_{0.75}$, CO$_{0.2}$, Al$_{0.05}$)O powder was mixed with Li$_2$CO$_3$ powder (product of Kanto Chemical Co., Inc.) so that Li/Co was 1.1, and the mixture was thermally treated in an oxygen atmosphere (0.1 MPa) at 825° C. for 24 hours, to thereby produce plate-like Li$_{1.0}$(Ni$_{0.75}$, CO$_{0.2}$, Al$_{0.05}$)O$_2$ powder particles (plate-like particles 15b2 of cathode active material) having a thickness of 20 μm.

The detailed production conditions employed in Experiment Examples 2-3 to 2-6 shown in Table 7 were the same as those employed in other Experiment Examples (e.g., 2-1), except that the aforementioned pore-forming material was added. The detailed production conditions employed in Experiment Example 2-10 shown in Table 7 are as follows.

NiO powder (particle size: 1 to 10 μm; product of Seido Kagaku Kogyo Co., Ltd.), CO$_3$O$_4$ powder (particle size: 1 to 5 μm; product of Seido Kagaku Kogyo Co., Ltd.), Al$_2$O$_3$.H$_2$O (particle size: 1 to 3 μm; product of SASOL), and Li$_2$CO$_3$ powder (particle size: 10 to 50 μm; product of Kanto Chemical Co., Inc.) were mixed at predetermined proportions so as to attain a composition of Li$_{1.50}$(Ni$_{0.75}$Co$_{0.2}$Al$_{0.005}$)O$_2$. The mixture was heated under oxygen (0.1 MPa) at 825° C. for 24 hours, to thereby yield a powder of Li$_{1.0}$(Ni$_{0.75}$CO$_{0.2}$Al$_{0.05}$)O$_2$ having a mean particle size of 3.0 μm.

The same procedure employed in, for example, Experiment Example 2-1, was repeated, except that the above-yielded powder was used, to thereby form a sheet having a thickness of 20 μm. The sheet-like compact was removed from the PET film. 20 g of compact was crumpled and placed in a sheath made of alumina (dimensions: 150 mm square×10 mm in height), and then heated in air at 900° C. (firing temperature for yielding an intermediate fired product) for 10 hours. Thereafter, the piece was cooled at 200° C./h to room temperature. Then, a portion of the piece which was not fused to the sheath was picked up, to thereby produce plate-like $Li_{1.0}(Ni_{0.75},CO_{0.2},Al_{0.05})O_2$ powder particles (plate-like particles 15b2 of cathode active material) having a thickness of 20 μm.

The plate-like particles of the Experiment Examples shown in Table 7 were evaluated, and the results are shown in Table 8. As is clear from Table 8, the ceramic sheets having a nickel-based composition were found to have the same characteristics as those of the ceramic sheets having a cobalt-based composition.

TABLE 8

|  | Voidage (%) | Mean pore size (μm) | Percent capacity retention (%) |
| --- | --- | --- | --- |
| Exp. Ex. 2-1 | 3.1 | 0.2 | 91 |
| Exp. Ex. 2-2 | 3 | 4.9 | 88 |
| Exp. Ex. 2-3 | 7 | 0.4 | 91 |
| Exp. Ex. 2-4 | 8 | 4.8 | 89 |
| Exp. Ex. 2-5 | 14.5 | 0.1 | 94 |
| Exp. Ex. 2-6 | 14 | 4.7 | 92 |
| Exp. Ex. 2-7 | 2.5 | 3.5 | 40 |
| Exp. Ex. 2-8 | 2 | 0.02 | 65 |
| Exp. Ex. 2-9 | 2.9 | 7.2 | 60 |
| Exp. Ex. 2-10 | 22 | 6.8 | 92 |

Similar to the aforementioned $LiCoO_2$ sheets, lithium oxide ceramic sheets of a nickel-based composition were evaluated in terms of peak intensity ratio [003]/[104] and effect of primary particle size. The results are shown in Tables 9 to 12. As is clear from Tables 9 to 12, the ceramic sheets having a nickel-based composition were found to have the same characteristics as those of the aforementioned $LiCoO_2$ sheets.

TABLE 9

|  | Li compd. | Li/M mole ratio | Li incorporation temp. (° C.) |
| --- | --- | --- | --- |
| Exp. Ex. 2-11 | $Li_2O_2$ | 2 | 750 |
| Exp. Ex. 2-12 | $Li_2O_2$ | 3 | 750 |
| Exp. Ex. 2-13 | LiOH | 3 | 775 |
| Exp. Ex. 2-14 | LiOH | 5 | 800 |
| Exp. Ex. 2-15 | LiOH | 10 | 800 |

TABLE 10

|  | Voidage (%) | Mean pore size (μm) | [003]/[104] peak intensity ratio | Percent capacity retention (%) |
| --- | --- | --- | --- | --- |
| Exp. Ex. 2-11 | 8 | 4.8 | 0.4 | 96 |
| Exp. Ex. 2-12 | 8 | 4.8 | 0.8 | 93 |
| Exp. Ex. 2-13 | 8 | 4.8 | 1.3 | 89 |
| Exp. Ex. 2-14 | 8 | 4.8 | 3 | 70 |
| Exp. Ex. 2-15 | 8 | 4.8 | 9 | 63 |

TABLE 11

|  | Li compd. | Li/M mole ratio | Li incorporation temp. (° C.) |
| --- | --- | --- | --- |
| Exp. Ex. 2-16 | $Li_2O_2$ | 2 | 750 |
| Exp. Ex. 2-17 | $Li_2O_2$ | 3 | 750 |
| Exp. Ex. 2-18 | LiOH | 3 | 775 |
| Exp. Ex. 2-19 | LiOH | 5 | 800 |
| Exp. Ex. 2-20 | LiOH | 10 | 800 |

TABLE 12

|  | Voidage (%) | Mean pore size (μm) | Primary particle size (μm) | Percent capacity retention (%) |
| --- | --- | --- | --- | --- |
| Exp. Ex. 2-16 | 8 | 4.8 | 0.2 | 94 |
| Exp. Ex. 2-17 | 8 | 4.8 | 0.6 | 92 |
| Exp. Ex. 2-18 | 8 | 4.8 | 2 | 89 |
| Exp. Ex. 2-19 | 8 | 4.8 | 3.2 | 81 |
| Exp. Ex. 2-20 | 8 | 4.8 | 6.5 | 65 |

Examples of Modifications

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The present invention is not limited to the constitution which is specifically disclosed in the description of the above embodiments. For example, the cathode collector 15a of the cathode 15 may be omitted.

In the present invention, the method of producing the plate-like particle of cathode active material is not limited to the aforementioned procedures. For example, the plate-like particle of cathode active material of the present invention is formed readily and reliably through the following production method.

1. Preparation of Raw Material Particles

As raw material particles, there is used an appropriate particle mixture of compounds of Li, Co, Ni, Mn, etc. at such proportions that the formed cathode active material $LiMO_2$ has a layered rock salt structure. Alternatively, raw material particles having a $LiMO_2$ composition (synthesized) may also be used. To such raw material particles, the aforementioned pore-forming material is added.

In the below-mentioned thermal treatment step, a lithium compound may be added in an excessive amount of about 0.5 to about 30 mol % in order to promote grain growth or compensate for volatile matter. Also, for promoting grain growth, a low-melting-point oxide such as bismuth oxide or a low-melting-point glass such as borosilicate glass may be added in an amount of 0.001 to 30 wt. %.

2. Raw Material Particle Sheet Forming Step

Through subjecting a mixture of raw material particles and a pore-forming material to sheet forming, an "independent"

sheet-like compact is produced. The sheet forming step is the same as the aforementioned two-step process.

3. Compact Thermal Treatment (Firing) Step

The sheet-like compact formed through the aforementioned forming step is thermally treated (fired) at a relatively high temperature (e.g., 1,200° C. to 1,500° C.) in order to proceed crystal growth with formation of pores, to thereby yield an "independent" sintered lithium composite oxide sheet for a cathode active material layer. This thermal treatment may be carried out in an oxygen atmosphere where, for example, the above-formed sheet-like compact is placed on a zirconia-made embossed setter.

4. Pulverization

The sheet obtained by the above-mentioned thermal treatment step was pulverized as stated above, to thereby produce plate-like particles 15b2 of cathode active material.

Differing from the above embodiment employing a two-step thermal treatment step including formation of an intermediate fired product (calcination) and lithium incorporation, the variation of the production method is performed as a one-step thermal treatment process. Therefore, it is called a "one-step process."

The ratio by mole of lithium to M; i.e., Li/M (Li/Co or Li/(Co,Ni,Mn)) of a sintered sheet represented by formula $Li_xMO_2$ is not limited to 1.0. However, the ratio is preferably 0.9 to 1.2, more preferably 1.0 to 1.1. Through controlling the ratio, excellent charge-discharge capacity is attained.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A plate-like particle for a lithium secondary battery cathode active material, wherein the plate-like particle has a structure in which numerous primary particles are bound to one another, each primary particle having a layered rock salt structure,
    wherein the plate-like particle has a thickness of 5 μm or more and less than 30 μm,
    a ratio of intensity of X-ray diffraction by the (003) plane to intensity of X-ray diffraction by the (104) plane, [003]/[104], of 2 or less,
    a mean pore size of 0.1 to 5 μm,
    a voidage of 3% or more and less than 15%, and
    wherein the intensity of X-ray diffraction is attained by measuring an X-ray diffraction profile of only the plate surface of the plate-like particle.

2. A plate-like particle for a lithium secondary battery cathode active material according to claim 1, wherein the plate-like particle has a ratio w/t of 3 or more, wherein t represents the thickness of the plate-like particle, and w represents the minimum size of the plate-like particle as measured in a direction orthogonal to the thickness direction which defines the thickness t.

3. A plate-like particle for a lithium secondary battery cathode active material according to claim 1, wherein the primary particles have a primary particle size of 5 μm or less.

4. A cathode of a lithium secondary battery having a cathode active material layer which contains a plate-like particle, wherein the plate-like particle has a structure in which numerous primary particles are bound to one another, each primary particle having a layered rock salt structure,
    wherein the plate-like particle has a thickness of 5 μm or more and less than 30 μm,
    a ratio of intensity of X-ray diffraction by the (003) plane to intensity of X-ray diffraction by the (104) plane, [003]/[104], of 2 or less,
    a mean pore size of 0.1 to 5 μm,
    a voidage of 3% or more and less than 15%, and
    wherein the intensity of X-ray diffraction is attained by measuring an X-ray diffraction profile of only the plate surface of the plate-like particle.

5. A cathode of a lithium secondary battery according to claim 4, wherein the plate-like particle has a ratio w/t of 3 or more, wherein t represents the thickness of the plate-like particle, and w represents the minimum size of the plate-like particle as measured in a direction orthogonal to the thickness direction which defines the thickness t.

6. A cathode of a lithium secondary battery according to claim 4, the primary particles have a primary particle size of 5 μm or less.

7. A cathode of a lithium secondary battery according to claim 4, wherein the cathode active material layer comprises a binder and the plate-like particles and an electroconducting aid dispersed in the binder.

8. A lithium secondary battery comprising at least the following:
    a cathode having a cathode active material layer which contains a plate-like particle, wherein the plate-like particle has a structure in which numerous primary particles are bound to one another, each primary particle having a layered rock salt structure, wherein the plate-like particle has a ratio of intensity of X-ray diffraction by the (003) plane to intensity of X-ray diffraction by the (104) plane, [003]/[104], of 2 or less a thickness of 5 μM or more and less than 30 μm, a mean pore size of 0.1 to 5 μm, and a voidage of 3% or more and less than 15%;
    an anode containing as an anode active material a carbonaceous material or a lithium-occluding substance; and
    an electrolyte disposed so as to intervene between the cathode and the anode,
    wherein the intensity of X-ray diffraction is attained by measuring an X-ray diffraction profile of only the plate surface of the plate-like particle.

9. A lithium secondary battery according to claim 8, wherein the plate-like particle has a ratio w/t of 3 or more, wherein t represents the thickness of the plate-like particle, and w represents the minimum size of the plate-like particle as measured in a direction orthogonal to the thickness direction which defines the thickness t.

10. A lithium secondary battery according to claim 8, wherein the primary particles have a primary particle size of 5 μm or less.

11. A lithium secondary battery according to claim 8, wherein the cathode active material layer comprises a binder and the plate-like particles and an electroconducting aid dispersed in the binder.

12. A plate-like particle for a lithium secondary battery cathode active material according to claim 1, wherein the [003]/[104] ratio is 0.6 or less.

* * * * *